Sept. 19, 1939.  R. G. MISPLEY ET AL  2,173,453
TISSUE PAPER PRESERVATIVE WRAPPER FOR CITRUS
FRUITS AND METHOD OF MAKING SAME
Filed May 17, 1939
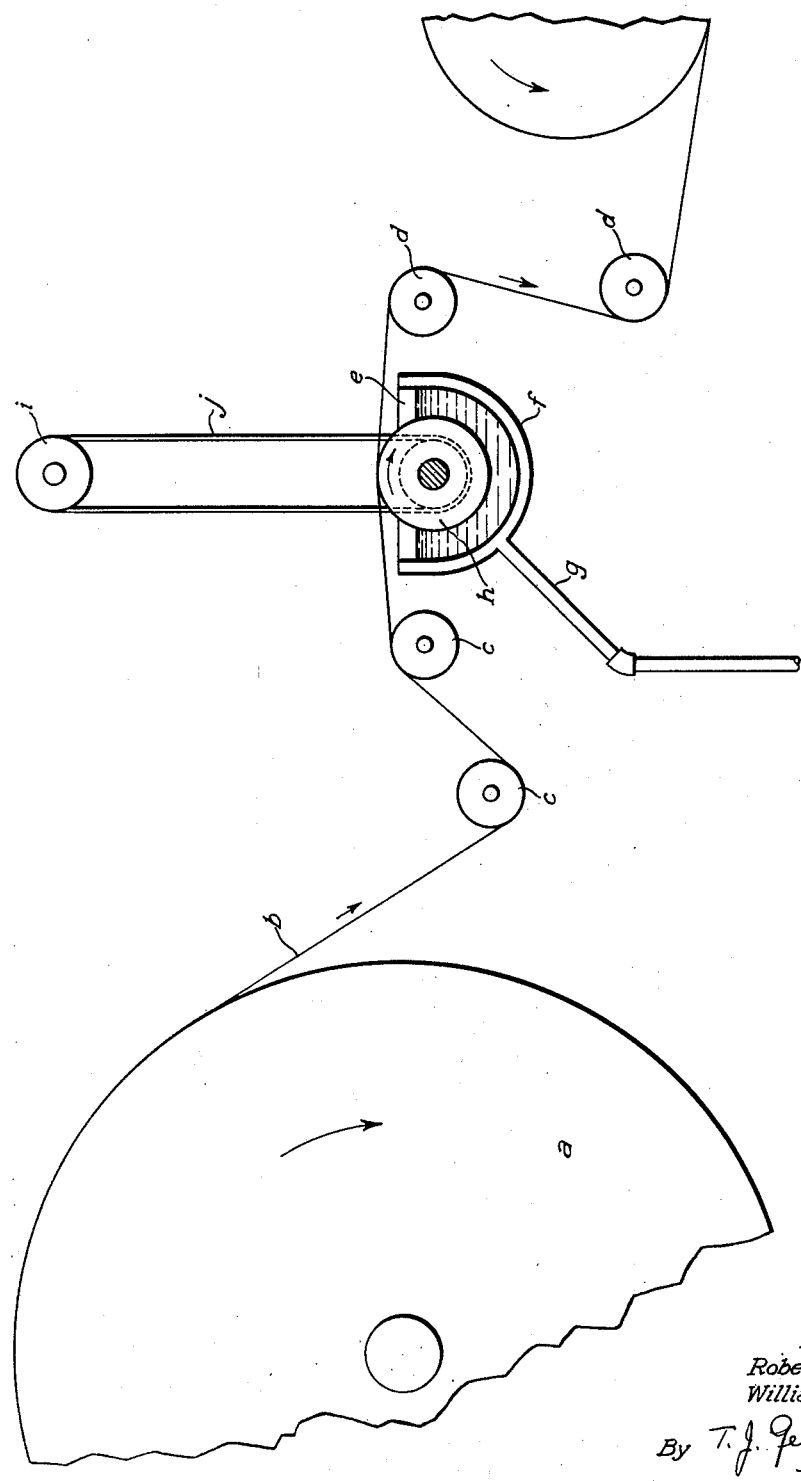
Inventor
Robert G. Mispley
William R. Barber
By T. J. Geisler and
F. R. Geisler.
Attorneys Patented Sept. 19, 1939

2,173,453

UNITED STATES PATENT OFFICE 2,173,453

TISSUE PAPER PRESERVATIVE WRAPPER FOR CITRUS FRUITS AND METHOD OF MAKING SAME

Robert G. Mispley and William R. Barber, Camas, Wash., assignors to Crown Zellerbach Corporation, San Francisco, Calif., a corporation of Nevada Application May 17, 1939, Serial No. 274,170

4 Claims. (Cl. 91—68)

The object of our invention is to provide tissue paper citrus fruit—particularly, oranges, grapefruit and lemons—wrappers of the usual weight, softness and strength, which shall hold material imparting to these wrappers the added property of efficiently preserving the individual fruit pieces from depreciation in quality and protect them against mold infection, during the maximum period of time to be taken into consideration for the delivery of the fruit after packing to the consumer.

We have discovered that the preservation of the quality of citrus fruit during such period is not alone a matter of controlling (retarding and preventing) mold growths and other blemishes characteristic of citrus fruits, but that three distinct factors must be considered in assuring the sum-total of the desired objective of fruit quality preservation by means of a tissue paper wrapper. These factors are:

1. Bruising as occasioned by squeezing, abrasion, creasing, etc., in the course of making up, transporting and handling the package or "pack", and which affects the fruit in its entirety;

2. Shrinking caused by water loss by evaporation through the pores of the fruit, which affects the fruit by depreciating its fullness, plumpness and luster; and 3. The various mold growths with which citrus fruit becomes infected, for example blue mold, green mold, etc.

The usual tissue paper wrapper may be said to exert some preservative effect including all these factors; but the protection thus accorded to the fruit does not meet full requirements, assuring the preservation of the fruit during its transit from place where packed to the consumer. In the first place, it is just as important to the seller of citrus fruits that the fruit retain its qualities of freshness, that is, fullness and luster of appearance,—in other words, show no evidence of shrunken appearance, and be free from surface blemishes arising from jostling in shipment and handling—, as it is that the seller be protected from waste of fruit by having to sort out and discard the fruit pieces which are decayed and spoiled by mold.

We have therefore concluded that mold control by the impregnation of the wrapper with a toxic chemical must not be the sole objective. The result to be achieved must include all of the three factors above mentioned. The wrapper must possess sufficient moistureproofness to prevent the wrapper from breaking down and disintegrating by wetting from mushy, contiguous decayed pieces of fruit, which induces spreading of the mold. To avoid this, it is necessary that each individual piece of fruit be inclosed in a wrapper having sufficient resistance to moisture so that when one piece of fruit becomes molded and mushy it will be held together, and isolated from wetting and infecting a contiguous or adjacent piece of fruit. Our study and observation along this line further demonstrated that mere haphazard, more or less, moistureproofness of the wrapper is not enough; the moistureproofness must be fixed within certain definite limits. We found that a high degree of moistureproofness, such as obtained, for example, in a heavily paraffin waxed sheet is detrimental and must be avoided. A fundamental consideration which must be given to the successful handling and storage of fresh fruits is that they are alive and carry on vital biological processes much the same after as before they are harvested. The must important of these biological processes is respiration.

A high degree of moistureproofness is undesirable because of the condensation and retention of the moisture-vapor of the fruit's respiration inside the wrapper. Thus while a wrapper having a high degree of moistureproofness is effective for preventing mold spread from one piece of infected fruit to another, the vapor condensation to water within the wrapper tends to induce and accelerate self-infection of a sound piece of fruit. On the other hand, fruit kept in wrappers possessing sufficient moistureproofness retains its plumpness and has only negligible shrinkage or weight loss which, as mentioned, is desirable in order to preserve the selling appearance of the fruit.

One of the main objects of our invention, therefore, is to impart to the tissue paper wrapper such moistureproofness as will enable the sheet to resist sufficiently disintegration by wetness, and yet prevent the sheet retaining within the wrapper of the fruit substantially all the moisture content of the respiration of the fruit, since such moisture retention is apt to cause senility and decay.

Our tests and observations have demonstrated that it is not a mere matter of giving the tissue paper citrus fruit wrapper some degree of moistureproofness, but the moistureproofness of the sheet must be controlled and fixed between narrow and definite limits in order to obtain positive and efficient results.

We accomplish the imparting to the sheet the required moistureproofness by the use of liquid paraffin oil fortified with a paraffin wax admixed, the two being miscible. Liquid paraffin oil is well known in its use on tissue paper fruit wrappers, but by itself is of little value as a moisture proofing agent. We found that it required the addition of paraffin wax in order to obtain a suitable material. We found a mixture consisting of liquid paraffin oil having admixed with it 25% of paraffin wax very efficient. We have used paraffin wax of 127-133° F. melting point and a liquid paraffin oil of 110 Saybolt viscosity. This designation, however, is not to be understood as excluding paraffin waxes, mineral oils or mineral hydrocarbons of other melting points and viscosities so long as the mixture produced lends itself to our purpose. We will hereinafter refer to this element of our invention as our paraffin-oil-wax mixture. But the mere use of a suitable moisture-proofing material for the tissue paper does not solve the problem. The limitation of the amount of this mixture introduced into the sheet must be sufficient to impart to the sheet the required moisture-resistance, but must not result in too close confinement of the moisture exuded by the fruit within the wrapper.

Our tests and observations further demonstrated that an effective fungi-controlling chemical agent with which to impregnate the sheet is a further indispensable factor. We find such an agent in diphenyl, which, furthermore, is compatible with mineral hydrocarbons such as liquid paraffin oil and paraffin wax, being miscible or soluble in them. Our tests and observations further demonstrated that the impregnation of the tissue sheet with diphenyl is best accomplished through the medium of our oil-paraffin-wax mixture, such as above mentioned; thus utilizing this paraffin-oil-wax mixture in the dual capacity of introducing the chemical into the sheet, and at the same time effecting the retention and prolongation of the effectiveness of the chemical, and, furthermore, imparting to the sheet the required moistureproofness.

Our experiments have demonstrated that tissue paper citrus fruit wrappers should be impregnated with approximately .0175 to .0297 of its weight with diphenyl. Such amount is critical. It assures a positive effect in mold control. A higher amount would introduce the possibility of damage to the fruit, and besides would incur an economic waste. Our experiments have further demonstrated that the diphenyl should be carried into the tissue sheet by the use of a paraffin oil mixture used as the carrier, and prepared substantially as above stated. The proportioning of paraffin oil and wax mixture relatively to the weight of the tissue sheet is also critical. Too small an amount fails to impart to the sheet the required moistureproofness, and too great an amount would be apt to render the tissue too moistureproof, and retain within the wrapper inclosing the fruit to too great an extent the moisture exhaled by the fruit, and thereby contribute to the spoiling of the fruit as above mentioned.

Our research and prolonged tests have demonstrated that the best treatment of tissue paper to be used as fruit wrappers, in order to obtain positive and optimum results, assuring the retention in the fruit of its natural freshness, fullness and luster of appearance, and protection of the individual fruit pieces against infection by mold from an adjacent contiguous decayed fruit piece, is by impregnating the tissue sheet with approximately 7% to 9% of its weight with our said paraffin-oil-wax mixture, with the latter mixture holding approximately 25% to 33% of its weight of diphenyl.

Our procedure for effecting the impregnation of the tissue sheet is, first, to make up the paraffin-oil-wax mixture and then dissolve in this mixture approximately 25% to 33% of its weight of diphenyl, and then apply the final mixture so produced to the tissue sheet by any convenient means, so that the treated sheet will carry approximately 7% to 9% of its weight of said paraffin-oil-wax mixture solvent with the latter holding said amount of diphenyl. In other words, the treated sheet must hold 7% to 9% of its weight of said paraffin-oil-wax mixture to give it the required resistance to disintegration by moisture and without retaining all moisture exuded by the fruit within the sheet wrapped around the latter. And the paraffin-oil-wax mixture must have dissolved in it said percentage of diphenyl. Thus the treated sheet will hold about 8.75 to 11.97 per cent of its weight of said oil-wax-diphenyl final mixture, and the latter figures may be used in determining whether the sheet has applied to it the required amount of said final oil-wax-diphenyl mixture.

The application of said final mixture to the sheet is conveniently made while the sheet is in process of making. But the application may also be made in the rewinding of the rolls taken off the machine into finished shipping rolls.

We have found it convenient to apply said final mixture to the sheet in the manner and by the devices illustrated in the accompanying drawing constituting a part of this specification.

In the drawing, $a$ represents a drying cylinder from which the sheet $b$ is led over guide rolls $c, c$, thence over application roll $h$, over guide rolls $d, d$, etc. The application roll $h$ is rotated at variable speed in a vat $e$ containing said final mixture, which is heated by a steam jacket $f$ receiving heating steam from a suitable source thru pipe $g$. The temperature of the material of the final mixture contained in the vat $e$ must be 130-140° F. so as to keep the mixture in a suitable liquid state. The speed of rotation of the application roll $h$ may be controlled—and thus the amount of final mixture applied to the sheet $b$ be controlled—by any suitable device, for example by Reeves drive, indicated by $i$, connected by belt $j$ with the application roll $h$. The method pursued, however, to cause the treated sheet to hold the required amount of final mixture is a matter of choice and expediency. The essential feature of our invention is that the treated sheet hold said amount of the paraffin-oil-wax-diphenyl mixture.

We claim:

1. A preservative tissue paper fruit wrapper containing about .0175 to .0297 of its weight of diphenyl bonded to the sheet by a solvent carrying said diphenyl and consisting of liquid paraffin oil fortified with paraffin wax, said diphenyl carrying solvent approximating between 7% to 9% of the weight of the paper, the wrapper being characterized by its resistance to disintegration by contact with moisture and by its capacity to prevent the dissipation and thus the loss in effect of said diphenyl by volatilization for a relatively long period of time, the wrapper permitting respiration of the fruit wrapped in it yet controlling evaporation of the fruit thru its pores.

2. A preservative tissue paper fruit wrapper containing about .0175 to .0297 of its weight of diphenyl bonded to the sheet by a solvent carrying said diphenyl and consisting of liquid paraffin oil fortified with approximately 25% of its weight with paraffin wax, said diphenyl carrying solvent approximating between 7% to 9% of the weight of the paper, the wrapper being characterized by its resistance to disintegration by contact with moisture and by its capacity to prevent the dissipation and thus the loss in effect of said diphenyl by volatilization for a relatively long period of time, the wrapper permitting respiration of the fruit wrapped in it yet controlling evaporation of the fruit thru its pores.

3. The method of producing a fruit preservative fruit tissue paper wrapper having the capacity to resist disintegration by contact with moisture and also to retain the effectiveness of the preservative chemical for a relatively long period of time, which method consists in preparing a mineral hydrocarbon mixture consisting of paraffin oil and paraffin wax, dissolving in such mixture in the amount of approximately 25%–33% of its weight of diphenyl, impregnating the tissue sheet with a final mixture so produced, and controlling the amount of final mixture applied to the sheet so as to be about 8.75% to 11.97% of the weight of the sheet.

4. The method of producing a fruit preservative fruit tissue paper wrapper having the capacity to resist disintegration by contact with moisture and also to retain the effectiveness of the preservative chemical for a relatively long period of time, which method consists in preparing a mineral hydrocarbon mixture consisting of about three parts by weight of paraffin oil and one part of paraffin wax, dissolving in such mixture in the amount of approximately 25% to 33% of its weight of diphenyl, impregnating the tissue sheet with a final mixture so produced, and controlling the amount of final mixture applied to the sheet so as to be about 8.75% to 11.97% of the weight of the sheet.

ROBERT G. MISPLEY.
WILLIAM R. BARBER.